United States Patent [19]

Hoffman

[11] Patent Number: 5,490,759

[45] Date of Patent: Feb. 13, 1996

[54] MAGNETIC DAMPING SYSTEM TO LIMIT BLADE TIP VIBRATIONS IN TURBOMACHINES

[76] Inventor: Jay Hoffman, 38 Yorktown Cir., Trumbull, Conn. 06611

[21] Appl. No.: 234,942

[22] Filed: Apr. 28, 1994

[51] Int. Cl.⁶ ............................................ F01B 25/06
[52] U.S. Cl. ........................ 415/10; 415/30; 415/119
[58] Field of Search .......................... 416/241 R, 219 R; 415/10, 30, 118, 119

[56] References Cited

U.S. PATENT DOCUMENTS

| | | | |
|---|---|---|---|
| 2,853,638 | 9/1958 | Bonnano et al. | 415/118 |
| 3,893,782 | 7/1975 | Pierpoline et al. | 416/241 |
| 4,722,668 | 2/1988 | Novacek . | |

FOREIGN PATENT DOCUMENTS

| | | | |
|---|---|---|---|
| 0601436 | 4/1978 | U.S.S.R. | 415/10 |
| 0788317 | 12/1980 | U.S.S.R. | 415/10 |
| 1121509 | 10/1984 | U.S.S.R. | 415/10 |
| 0489861 | 1/1953 | United Kingdom | 415/10 |
| 0689901 | 4/1953 | United Kingdom | 415/10 |

Primary Examiner—Edward K. Look
Assistant Examiner—Mark Sgantzos

Attorney, Agent, or Firm—Brumbaugh, Graves, Donohue & Raymond

[57] ABSTRACT

A system that provides reliable blade damping with the capability to limit vibration in the blade tips to inconsequential amplitudes. A preferred embodiment of the invention comprises configurations of stationary electromagnets placed on a turboengine in three groups of three magnets, each separated circumferentially by 120 degrees, and each being powered and controlled by one central electronics module. The module can turn on the magnetic fields when the rotor is at a known critical speed or passing through a range of speeds that are known to cause large vibrations. Each blade tip enters the magnetic field of each electromagnet which is turned on once in a complete rotation. The electromagnets are located on or embedded in the casing surrounding the blade disk assembly. The blades may be of either magnetic or nonmagnetic material, but must be able to conduct an electrical current. As the blades cut through the lines of force of the electromagnets, bi-circulating eddy currents are set up in conformance to Faraday's Law of Magnetic Induction. The vibratory motions in the blades are dampened by the forces of the eddy currents. The preferred application of this invention is to gas turbine engines used to power passenger, cargo and military aircraft. Other possible applications include damping steam turbine blades for power stations and nuclear reactor systems.

16 Claims, 5 Drawing Sheets

MAGNETIC DAMPING SYSTEM TO LIMIT BLADE TIP VIBRATIONS IN TURBOMACHINES

TECHNICAL FIELD

This invention relates to a magnetic damping system to limit the tip vibration of blading used in turbomachines.

BACKGROUND OF THE INVENTION

Blade damping is an important feature that increases reliability in turbomachines by limiting the level of vibration created in rotating blades. Currently, blade damping in turbomachines is generally accomplished by inducing rubbing motion between contacting parts, causing frictional losses in the kinetic energy of the blades and thus reducing their level of vibration. The portions of the system that are caused to rub for damping purposes are typically placed in four locations. The first portion is a dove tail attachment used to fasten blades to disks or casings in turbomachines by means of interlocking serrations of contacting material at the blade base or root. The friction produced when the blade vibrates acts to dissipate kinetic energy and thus reduce vibration level. The second portion is a platform damper which uses the blade platform as a friction surface to dissipate kinetic energy and reduce vibration level by rubbing against the platforms of adjacent blades. The third portion is a mid-span shroud segment attached to each blade at the mid-way location of the blade span, as opposed to the base, which acts to bridge adjacent blades and causes contacting surfaces to rub and dissipate kinetic energy. Finally tip shrouds, having rubbing segments located at the blade tips that abut adjacent blade tip shrouds, produce a rubbing action that dissipates energy and reduces vibration.

Frictional dampers, such as those referred to above, derive their energy dissipation qualities from relative motion between contacting surfaces. Such mechanisms are not perfectly reliable and depend upon the maintenance of stable contacting force levels for their proper functioning. Since rubbing parts are prone to wear away over time, the contact force stability will decay with use causing a loss in damping effectivity. This limits damping to undesirably low levels, too low to prevent a significant shortening of blade life. The alternative is to use more frequent maintenance and live with reduced damping for some limited time. These compromises result in sub-par damper effectiveness, reduced machine safety and increased cost of maintenance.

There are other problems associated with frictional dampers now use(] on blades of turbomachines. Frictional dampers reduce blade performance. The blades are intended to effect an interchange of work between a flowing medium and the rotating shaft output. The use of mid-span or blade tip shrouds will always degrade that function to some degree by creating flow disturbances which causes some performance loss to occur. Additionally, such frictional dampers create manufacturing problems. A currently desirable means of manufacture, related to integral blade/disk assemblies, is not compatible with the use of frictional damping. The use of an integrally cast structure, where the blades and disk are created as one part, offers desirable cost advantages but does not facilitate the creation of adjacent rubbing surfaces of the type discussed above.

Accordingly, it is desirable to have a system of damping that allows integral cast structures, reduces frequent repairs due to wear and allows for increased engine efficiency by removing shrouds which reduce blade performance.

U.S. Pat. No. 4,722,668 discloses a device for damping blade vibrations in turbo-machine by equipping shroud plates on the blades with permanent magnet inserts. This dampens the blade vibrations due to the magnetic force between the individually paired magnets which keeps the shroud plates together or separated depending upon the polarity of the two magnets.

However, the '668 patent still requires shrouds which reduce blade performance. The extra mass of the magnets on the blades also increases the level of stresses on the blades reducing performance and lowering fatigue margins. Permanent magnets located on a turbine blade would also be severely degraded by high temperatures within a gas turbine.

SUMMARY OF THE INVENTION

The present invention solves the above noted problems of blade damping by providing an apparatus preferably including at least one electromagnet attached to the engine casing radially adjacent to rotar blade tips, and having poles spaced from the tips of the rotating blades, and preferably a controller to initiate and terminate magnetic damping responsive to a condition where blade vibration occurs. This mechanization provides reliable blade damping with the capability to limit vibration in the blade tips to inconsequential amplitudes.

A preferred embodiment of the invention comprises a configuration of stationary electromagnets placed on a turbine engine comprising three groups of three magnets, each separated circumferentially by 120 degrees, and each being powered and controlled by a single electronics module. The controller module preferably can turn on the electromagnets creating magnetic fields when the rotor is at a critical speed where resonant vibrations in the blades are known to occur. Each blade tip enters the magnetic field of each electromagnet once in a complete rotation. The electromagnets are located on or preferably embedded in the casing surrounding the blade disk assembly. The blades may be of either magnetic or nonmagnetic material, but must be able to conduct an electrical current. Any metal may therefore serve this function, including steel, aluminum, and titanium. Magnetic blade tips may be used on nonmagnetic blades to increase damping effectiveness.

As the blades cut through the lines of force of the electromagnets, bi-circulating eddy currents are set up in conformance to Faraday's Law of Magnetic Induction. The fields produced by these eddy currents must always produce forces, acting upon the current carrying structure (in this case the blade), that oppose the motion that initially produced the current. Since the total blade motion includes the rotary velocity of the blades as well as vibratory motion of the blades, forces are developed that oppose both kinds of motion. However, since the force level needed to effect strong damping of vibrations is very small in comparison to the force inhibiting rotation, the electromagnets are capable of producing large vibration damping effects, but inconsequential rotationally impeding effects.

One object of the invention is to provide damping action without influencing the functional design of the blade to be damped. This is an important advantage over a blading system utilizing shrouding or platform provisions for blade damping which degrades performance and creates manufacturing problems for an integral cast structure.

Another object of the invention is to provide damping action only when certain conditions are met by controlling the power to the electromagnets which turn the electromagnetic fields on and off. This allows damping at proper rotor speeds where peaking vibrations are expected and prevents excess power dissipation.

Still another object is to provide an inherent reliability assuring that sufficient damping is always available when needed. A frictional damper is limited by the laws of probability governing dimensional tolerances, thermal distortion effects, and the process of frictional wear to which the magnetic approach used in this invention is not sensitive.

The immediate application for this invention is seen in the gas turbine engines used to power passenger, cargo transport, and military aircraft. Secondary applications are in damping compressor and turbine blades for power stations, nuclear reactor systems, etc.

BRIEF DESCRIPTION OF THE DRAWINGS

Further objects, features and advantages of the invention will become apparent from the following detailed description taken in conjunction with the accompanying figures showing a preferred embodiment of the invention and some aspects of the analytical model used in certain feasibility calculations, in which.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION

The present invention is directed towards a magnetic damping system to limit the tip vibration of blading used in turbomachines. This particular illustrative embodiment depicts one configuration of electromagnets from many possibilities.

Figure 1:
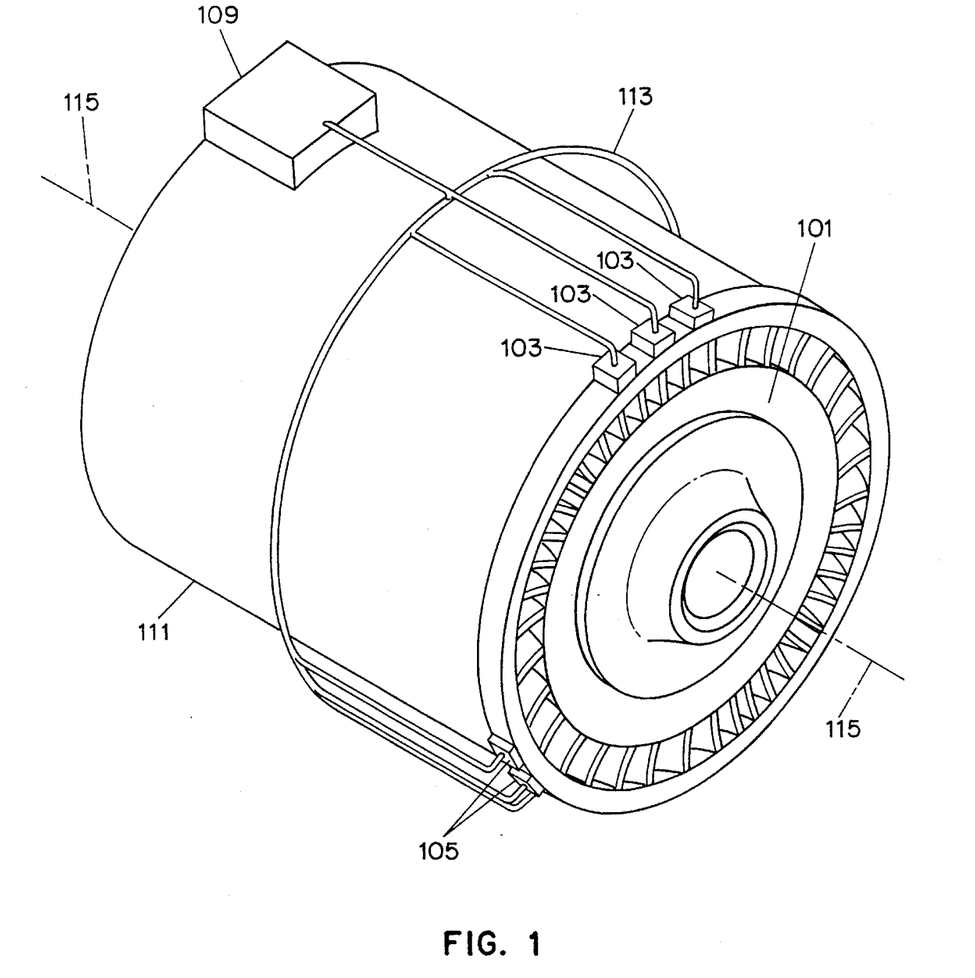
FIG. 1 illustrates the outside of a turbomachine with the magnetic damping device in accordance with the invention.

FIG. 1 depicts the outside of a turbomachine comprising a blade-disk assembly 101, electromagnet group 103, electromagnet group 105, electromagnet group 107 (not shown), controller 109, casing 111, and cable 113. Blade-disk assembly 101 sits within casing 111 and is able to rotate around a center axis 115. In accordance with this illustrative embodiment, electromagnet groups 103, 105 and 107 each comprise a group of three electromagnets, each group preferably being placed in casing 111 and separated circumferentially by 120 degrees, and each electromagnet is powered and controlled individually by controller 109. Electromagnet group 107 is located on the back side of casing 111 from the viewing perspective of FIG. 1. Controller 109 is a power module which supplies power to each electromagnet when the rotation of the blade-disk assembly achieves a predetermined condition as described below. Controller 109 is connected to each electromagnet by cable 113.

Figure 2:
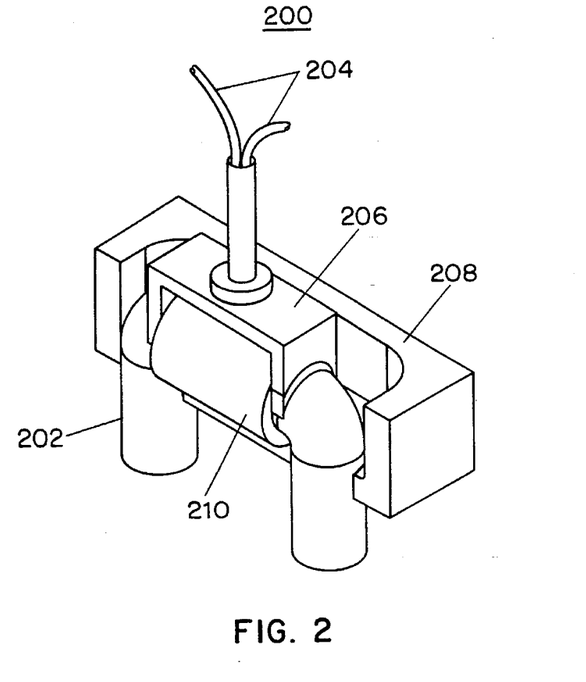
FIG. 2 illustrates an electromagnet assembly in accordance with the invention before it is installed in the casing.

FIG. 2 depicts one electromagnet assembly 200 configured for installation. Electromagnet assembly 200 comprises magnet core 202, clamp 206, containment structure 208, wires 204 and armature winding 210. Magnet core 202 is of horse-shoe shape and is held in place by clamp 206 which is attached to containment structure 208. Wires 204 allow for a proper connection from electromagnet assembly 200 to controller 109 to enable sufficient power to turn on electromagnet assembly 200 when required. Wires 204 are wrapped around magnet core 202 and form armature winding 210. Current flowing through wires 204 around magnet core 202 create an electromagnetic force in accordance with the invention.

Figure 3:
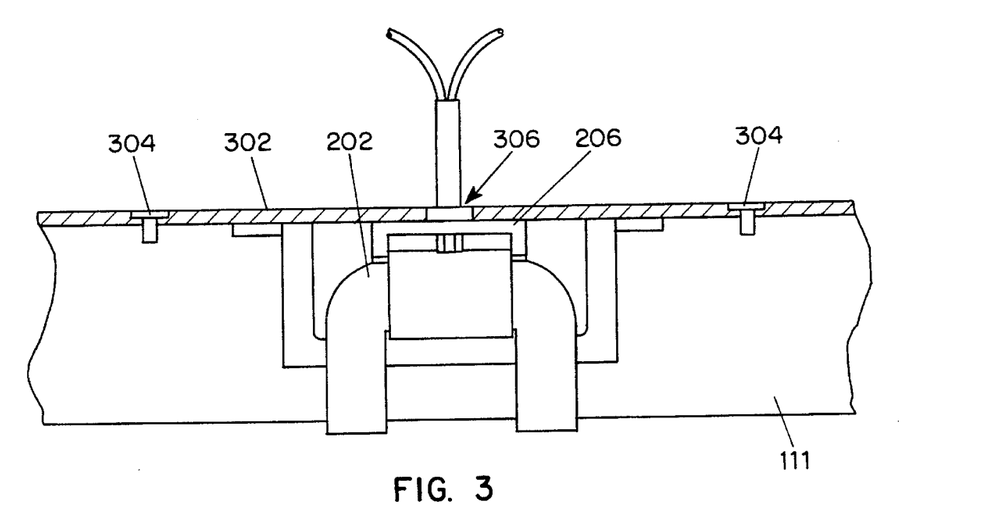
FIG. 3 illustrates an electromagnet assembly in accordance with the invention properly installed in the casing of the turbomachine.

FIG. 3 depicts electromagnet assembly 200 properly installed in casing 111. A cavity is created in casing 111 for each electromagnetic assembly 200. Container 208 fits into the constructed cavity. Magnet core 202 is placed in clamp 206 so that the poles of magnet core 202 extend through the bottom of casing 111. A cover seal 302 is then placed over the top of casing 111 and fastened to casing 111 with screws 304. Cover seal 302 contains a hole 306 above magnet 202 large enough to allow leads 204 to pass through. Cover seal 302 preferably is made to compress a compliant gasket material which prevents leakage from the potentially high internal static pressure surrounding the rotor.

Figure 4:
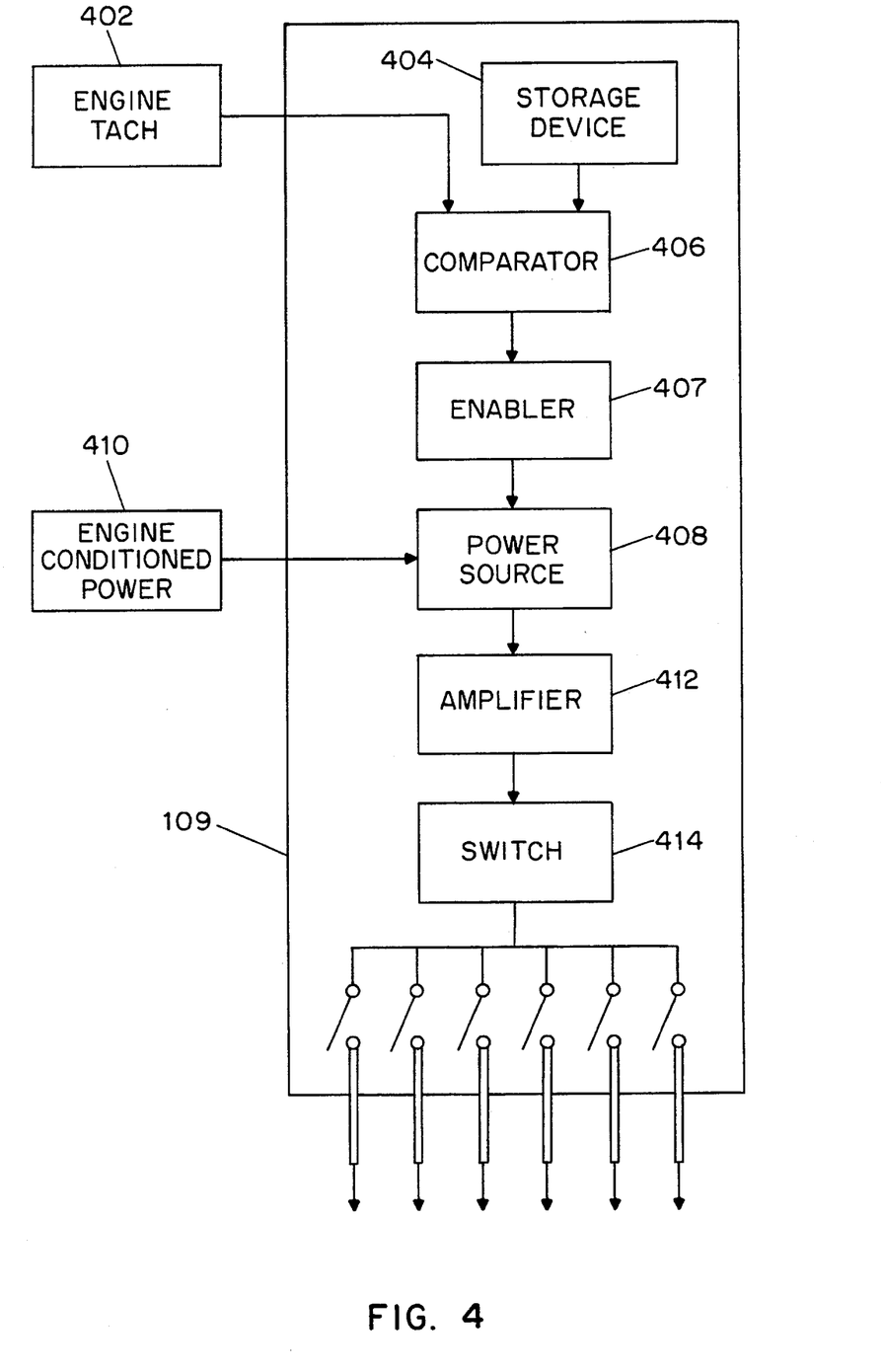
FIG. 4 is a schematic diagram of a controller used to selectively power the electromagnet assemblies in accordance with the invention.

FIG. 4 is a schematic diagram of controller 109. Controller 109 comprises storage device 404, comparator 406, enabler 407, power source 408, amplifier 412, switch 414 and wires 416. Data from engine tach 402 containing the current engine speed of blade-disk assembly 101 is compared by comparator 406 to the data stored in storage device 404 which contains the critical speeds of the turbomachine based on blade characteristics and the engine configuration. Storage 404 also contains data on other parameters that affect blade vibration. These additional parameters include inlet temperature, inlet pressure and compressor pressure of the turbomachine.

The electromagnet assemblies may be activated by the controller in one of several ways. The fields may be turned on synchronously with the arrival of a blade directly within the field of any one magnet and then extinguished as that blade leaves the range of the field. Alternatively, the fields may be turned on singly or all at once, in a synchronous manner as previously described, depending upon the spatial relationships of each blade to the electromagnets. Another possibility is that the sequence of magnet activation may be monotonic in the direction of rotation, monotonic opposite to the direction of rotation, or completely non-monotonic. This activation choice would depend upon the number of blades in the rotor to be damped, the number of magnets being used, and the angular position of each magnet.

By means of this programmable method of turning on and off the electromagnetic fields, the use of electrical energy may be conserved and the parasitic torque loss minimized in effect such that the damping action is used only when it is needed, i.e., to mitigate resonant vibration occurring at known critical rotor speeds and to reduce the intensity of "blade flutter", a potentially destructive effect caused by inadequate damping. Blade flutter will occur at specific measurable conditions of rotor speed, inlet temperature and pressure, and compressor pressure ratio. Measurement of these parameters can be used to program magnet activation through the controller. Such parameters are constantly measured during machine operation and this measurement can be used to activate magnetic damping via controller 109 when it is needed.

In this preferred embodiment, when the measured parameters reveal critical speeds (for maximum vibrations) in comparator 406, enabler 407 is activated which enables power source 408. Engine conditioned power 410 feeds power source 408 with the correct power level to activate the electromagnets after conditioning the aircraft power source to a desirable level. Amplifier 412 controls the power to the proper level with respect to the number of magnets to be activated. Switch 414 selects which set of magnets to activate. Leads 416 contained in cable 113 carry the power to the selected electromagnets.

Figure 5:
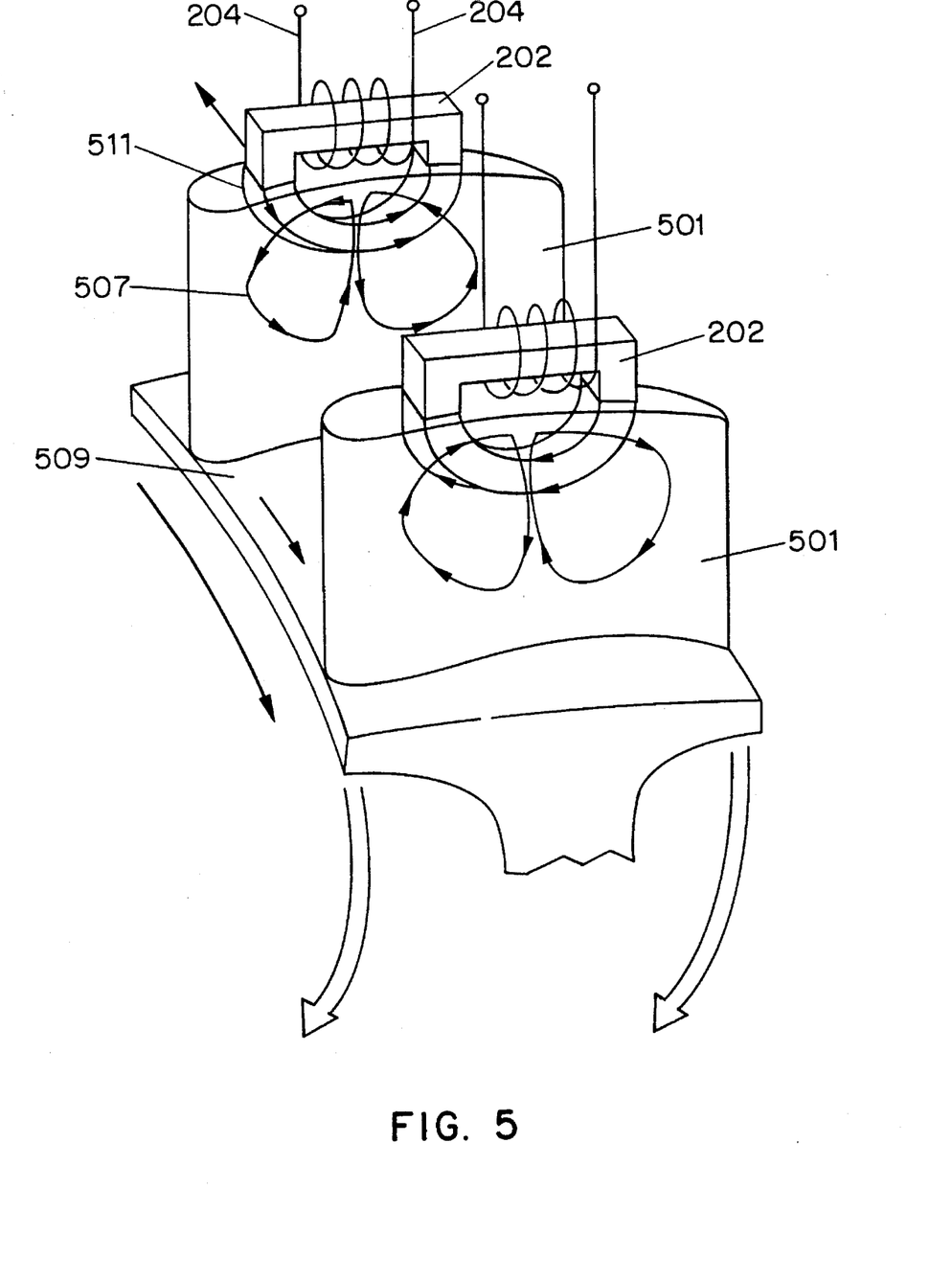
FIG. 5 illustrates a portion of the blade-disk assembly to show the operation of the invention.

FIG. 5 depicts a portion of blade-disk assembly 509 and two magnet cores 202 to show the operation of the invention. Two blades 501 are shown at one point in their rotation when each blade tip is present in the field of one of the stationary magnet cores 202.

The electromagnet assemblies in FIG. 5 are shown only in part as magnet core 202 and wires 204 for illustrative purposes but would normally contain all components of electromagnet assembly 200 of FIG. 2 and be embedded in casing 111 as shown previously in FIG. 3. Wires 204 are wrapped around magnet core 202 a predetermined number of times and each electromagnet assembly is turned on when a voltage is applied to wires 204 which is supplied by controller 109. When the electromagnet assembly is turned on, lines of force 511 are produced setting up a magnetic field. As the blades 501 cut through the lines of force 511 of electromagnet assembly 200, bi-circulating eddy currents 507 are set up in conformance with Faraday's Law of Magnetic Induction.

The fields produced by these eddy currents must always produce forces, acting upon the current carrying structure (in this case the blade), that oppose the motion that initially produced the current. Since the total blade motion includes the rotary velocity of the blades as well as vibratory motion of the blades, forces are developed that oppose both kinds of motion. However, since the force level needed to effect strong damping of vibrations is very small in comparison to the force producing rotation, the electromagnets are designed to produce large vibration damping effects, but inconsequential rotationally impeding effects.

The magnitudes of the two components of eddy current induced forces, that of impeding rotation and reducing vibrations, should be calculated to ensure a sufficient level of damping of the vibratory motion while not significantly impeding rotation. To confirm the feasibility of a given configuration of the present invention, an analysis must be performed to estimate the size of these two effects based on the given parameters. One such analysis was performed for this preferred embodiment as described below.

Figure 6:
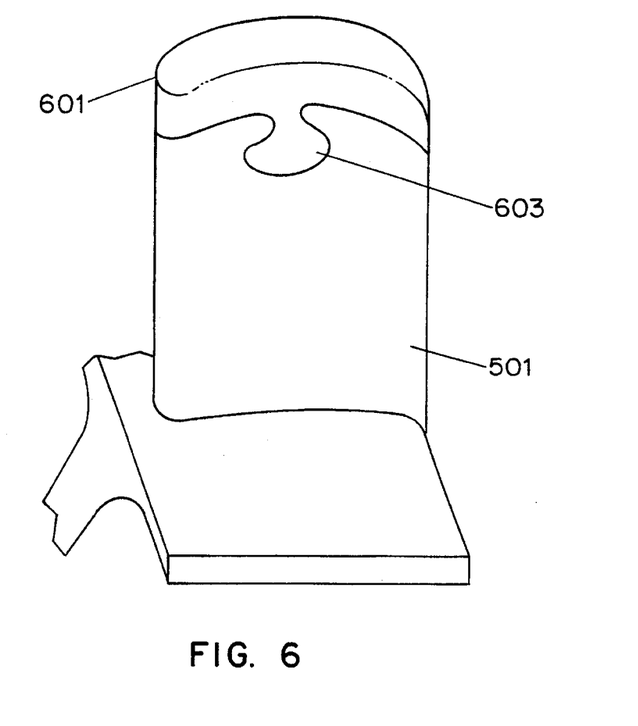
FIG. 6 illustrates a portion of the blade-disk assembly including a magnetic tip in accordance with the second embodiment of the invention.

FIG. 6 is an illustration of a second embodiment of the invention. FIG. 6 comprises a rotor blade 501, a magnetic blade tip 601, and a dove tail attachment 603. In FIG. 6, blade tip 601 may be a separate part made of magnetic material, and attached to blade 501. The attachment may be a dove-tail type attachment, shown as dove tail attachment 603 and wedged in place, much like the dovetails used to attach blades to a disk. Any practical means of attachment would be useable that would not degrade the structural properties of either the blade or the separable blade tip. This includes but is not limited to laser welding, electron beam welding, adhesive bonding, resistance welding, etc., and determined by the specifics of an application. Magnetic tip 601 serves to increase flux density cutting the blade material per field coil volt by reducing flux loss and increasing magnetic induction. This will permit the use of lower field coil voltage than the first embodiment without loss of damping effectivity. The increased damping can be accomplished through the use of Mu Metal with its unique properties of permeability and resistivity.

Figure 7:
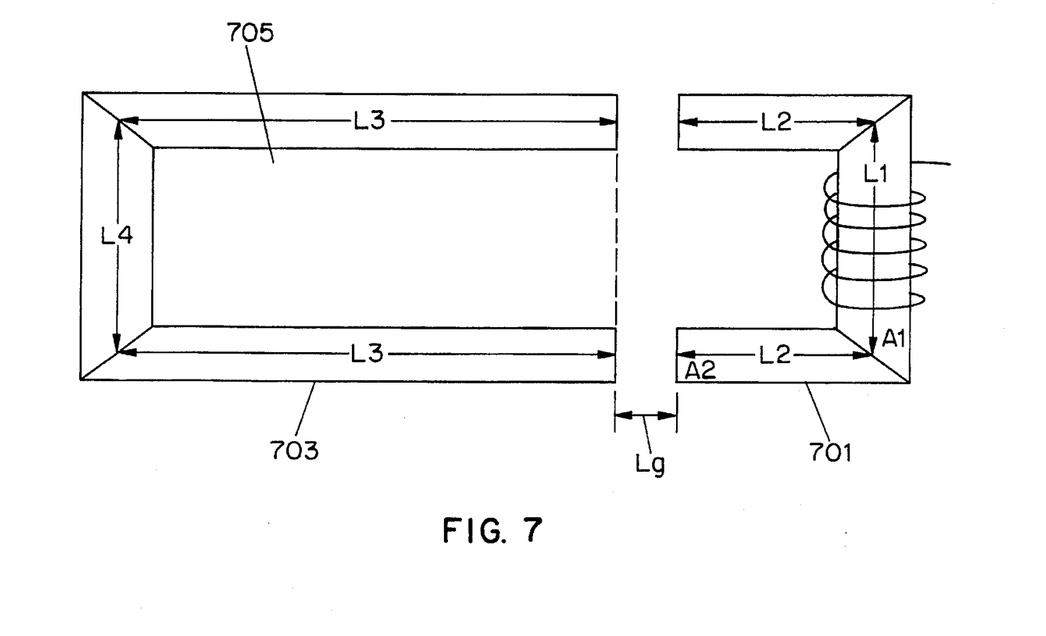
FIG. 7 illustrates a model of the magnetic circuit used in estimating damping levels and rotor drag effects of the damper system in accordance with the invention.

FIG. 7 depicts the basic magnetic circuit sized to be approximately compatible with an ordinary blade-disk structure ("blisk"). FIG. 7 comprises magnet 701, blade 705, and the path of the current generated by the magnetic field in blade 705 represented in path 703. Path 703 runs around the edges of blade 705 for some portion of the span as determined from analytical considerations. Applying the following parametric assignments, the flux, torque loss, and damping potential of the system is estimated to ensure proper damping. In this example, the material used for the blisk structure is non-magnetic in nature, such as titanium. The following calculations will ensure a working system for the given parameters and an estimate of effectiveness of the chosen parameters.

There are five sets of calculations required to verify a workable system. The first step is to select the appropriate size of parameters of electromagnet assembly 200 of FIG. 2 and the rest of the system. The next step is to define the circuit geometry of magnet core 202. From these calculations, the flux density of the field generated by electromagnet assembly 200 can be determined. Next, the motion induced potential on the blade is calculated when the blade travels through the magnetic field. From all of the above calculations, the damping effect on the vibrations in the blade can be calculated to ensure proper damping.

The preferred embodiment does not include magnetic material on the blade tips but requires a larger armature voltage and current than is necessary for the embodiment in FIG. 6. However, in the preferred embodiment, no alterations to the blades are required. In the following analysis a scaling of the preferred embodiment is presented, leading to an estimate of damping. Included in the analysis are the effects of the second embodiment on the calculations where the values would be different, as indicated by an asterisk and the notation "SE" preceding the second embodiment values. The second embodiment includes blade tips made of magnetic material.

The analysis is as follows:

I. SIZING OF PARAMETERS FOR THE ELECTROMAGNET

The material chosen for the blade-disk assembly in this preferred embodiment is titanium which is non-magnetic. A higher magnetization intensity will be required to offset the increased reluctance of the chosen non-magnetic material in the flux path.

This step involves providing numerical definitions for wire size, number of turns on the armature, voltage, current, and power levels.

The selection of parameters of a typical circuit according to the invention is as follows:

(1) $N:= 2000$ (turns of #27 copper wire which is selected to encircle the magnet);
(2) $LC:= 179.071$ meters (Length of conductor, i.e. copper wire);
(3) $Eav:= 200$ volts (voltage available from power supply); *$SE - Eav:= 31$ volts;
(4) $RRc:= .169$ ohms per meter of #27 copper at 20 degrees C. (from table);
   $Rc:= RRc \cdot Lc = 30.263$ ohms @ 20 degrees C. (Resistance of entire wire)
(5) $dw:= 3.606 \cdot 10^{-4}$ meters (diameter of #27 wire);

$$Aw:= \frac{\pi}{4} \cdot dw^2 \text{ (Cross sectional area of #27 wire in square meters)}$$

(6) $\rho'c:= .00688 \cdot 10^{-8}$ ohm meters/degree C. (Temperature sensitivity of copper resistivity);
(7) $Tfop:= 300°$ C. (572 F.) (operating temperature of copper wire in accordance with the invention);

$$Tcop:= \frac{5}{9} \cdot (Tfop - 32) \text{ (convert to Celsius scale)}$$

From the above selected parameters, we can calculate the following variables listed below:

(a) $R'c:= Rc + \rho'c \cdot (Tcop - 20) \cdot \frac{Lc}{Aw}$ (resistance of copper at operating temperature);
$Rc = 30.263$ (from above), therefore plugging in the values,
$R'c = 64.022$ ohms @ 300 degrees C.;

(b) $I:= \frac{Eav}{Rc} = \frac{200v}{30.263\Omega}$ ∴ $I = 6.609$ amps

*$SE - I:= 1.652$ amps (amperes of coil current);

The coil can be shortened by arranging wires in concentric layers to allow for limited space restrictions. This would alter the chosen configuration in the following way:

$Nlw:= 16$ (number of layers in one concentric winding):

(8) $Lcoil:= \frac{N}{Nlw} \cdot dw = \frac{2000}{16} \cdot 3.6068 \cdot 10^{-4} = 0.045$ meters (length of coil with layers);

(9) $\frac{\text{Blisk Definition}}{\text{configuration}}$ - parameters for the blades on the disk (a) $Db:= .2870$ meters (meters of typical blisk diameter to the blade tips);
   Typical blade cord length = 3 inches (.076 meters)
(b) $Nb:= 30$ (blades upon the blisk);
(10) $Din:= .006$ meters (inner diameter of coil when wrapped around magnet);
(11) $Wf:= 1.25$ (meters of insulated wire diameter per meter of wire diameter);
(12) $Dcoil:= Din + 2 \cdot Nlw \cdot dw \cdot (Wf) = .006 + 2 \cdot 16 \cdot 3.6068 \cdot 10^{-4} \cdot 1.25$, $Dcoil = .0144$ meters (.5680 inches) (outer diameter of coil when wrapped around magnet);

To summarize at this point, the coil geometry is now defined with its length at 1.77 inches (0.045 meters), its outer diameter (Dcoil) is 0.568 inches (0.0144 meters), its inner diameter (Din) at 0.25 inch (or 0.006 meters) (at room temp.), with 16 layers of #27 Cu wire, current @ I=6.609 amps, N=2000 turns, working off of a Eav=200 volt source. The length of the conductor (Lc)=179.07 meters.

II. DEFINING THE MAGNETIC CIRCUIT GEOMETRY

The process of sizing the magnetic circuit is accomplished by defining the following parameters (see FIG. 7):

(1) $L_1 = .076$ meters ~ taken as equal to the blade chord length (soft iron);
(2) $A_1 = \frac{\pi}{4} D_{in}^2 = 2.827 \times 10^{-5}$ meters squared (magnetic inner core area);
(3) $\mu_1 = 100$ (permeability for soft iron);
(4) $L_2 = .019$ meters (pole piece length) (see FIG. 7);

(5) $\mu_2 = 100$
(6) $A_2 = A_1$ } (Taken as part of magnetic core);

(7) $Lg = 10^{-3}$ meters (air gap length);
(8) $Ag = A_2$ (Taken as equal to the pole face area);
(9) $\mu g = 1.0$ (permeability of non-magnetic material);
   *$Se - \mu_4 = 100,000$ (permeability of Mu metal)
(10) $L_4 = .119$ meters (distance through blade material);
   *$SE - L_4 = .076$ meters
(11) $\delta_b = D_{in}$ (equal to core diameter);
(12) $t_m = .003$ meter (mean blade air foil thickness);
(13) $A_4 = \delta_b \cdot t_m$ (5) (allowing for a 5/1 dispersion of field emanating from focusing pole pieces on electromagnet);
   $A_4 = 9.0 \times 10^{-5}$ meters square (blade path area);
   *$SE - A_4 = 3.6 \times 10^{-5}$ square meters

III. COMPUTING THE FLUX DENSITY

The following parameters and calculations are necessary for computing the flux density of the field generated by the electromagnet:

First, the reluctance of the system must be calculated from the variables defining the circuit geometry in part II:

(1) $Rel: = \frac{10^7}{4 \cdot \pi} \cdot \left[ \frac{L1}{A1 \cdot \mu i} + 2 \cdot \frac{L2}{A2 \cdot \mu i} + \frac{2 \cdot Lg}{Ag \cdot \mu g} + \frac{L_4}{A_4 \mu_g} \right]$ $= \frac{10^7}{4 \cdot \pi} \cdot \left[ \frac{.0301}{(.0005)(100)} + 2 \cdot \frac{.00753}{(.00025)(100)} + \frac{2 \cdot .0095}{(9.6774 \cdot 10^{-6})(1)} + \frac{.119}{(9.0 \times 10^{-5})(1)} \right]$ $Rel = 1.140 \cdot 10^9$ amperes/weber
*$SE - Rel = 8.729 \cdot 10^7$ amperes/weber Then the flux density can be calculated:

(2) $\Phi:= \frac{N \cdot I}{Rel} = \frac{200 \cdot 6.61}{1.144 \cdot 10^9}$ $\Phi = 1.155 \cdot 10^{-5}$ webers (magnetic flux of the system);
*$SE - \Phi = 3.785 \cdot 10^{-5}$ webers;

(3) $\beta g:= \frac{\Phi}{Ag} = .4103$ weber/square meter

*$SE - \beta g:= 1.339$ weber/square meter (flux density of the gap);

IV. DETERMINING THE ROTATION INDUCED POTENTIAL AND RESULTING DRAG TORQUE ON THE BLADES

These calculations and parameter definitions determine the induced potential on the blade when it is rotating through the fields of the electromagnets.

(1) Maximum fan rotor speed is assumed to be 2530 rpm.
   Thus: $NR:= 2350$ rpm and:
(2) $\Omega:= \frac{Nr}{60} \cdot 2 \cdot \pi$ $\Delta max = 246.091$ rads/sec (rotor speed);
(3) $Ro:= 0.254$ meters = 10 inches (Disk outside radius);

-continued
(4) $Lb$: = 0.254 meters = 10 inches (blade length);
(5) $V\tau$: = $\tau max \cdot (Lb + Ro)$
$V\tau$ = 125.014 meters/sec (maximum blade tip velocity);

(6) $\alpha s$: = $\frac{\pi}{6}$ radius (blade stagger angle);

(7) $Ch$: = .076 meters (chord length);

(8) $Ee$: = $V\tau \cdot Ch \cdot \frac{\beta g}{5} \cdot \sin(\alpha s)$

Let $\beta$: = $\frac{\beta \alpha}{5}$
(using a 5/1 dispersion loss effect as
determined from analytical data published by Shortley and
Williams in "Physics" Vol. II - Prentiss Hall)
$Ee$ = .390 volts (induced potential);
*$SE - Ee$: = 1.972 volts
(9) $Res$: = $1.57 \cdot 10^{-8}$ ohm meters (resistivity
of titanium alloy);
* $SE - Res$: = $16 \cdot 10^{-8}$ ohm meters (resistivity
for Mu Metal);

$Re$: = $Res \cdot \frac{L4}{A4}$   $Re = 2.076 \cdot 10^{-5}$ ohms
(effective resistance in blade eddy current path);
*$SE = Re$: = $5.0 \times 10^{-4} \Omega$ (10) $Ie$: = $\frac{Ee}{Re}$   $Ie = 2.929 \cdot 10^4$ amps (eddy current);

(11) $Fe$: = $\beta \cdot Ch \cdot Ie$   $Fe = 117.128$ Newtons (drag force);

(12) $Te$: = $Fe \cdot \left( \frac{3 \cdot Ro}{4} + Lb \right)$ one magnet active at any instant $Te$ = 52.06 Newton Meters (effective grag);
*$SE - Te$ = 52.28 Newton Meters or
$Te$ = 38.36 ft lbs. or about 2.3% of maximum engine torque
*$SE - Te$ = 38.56 ft lbs. or about 2.3% of maximum
engine torque
(The losses are minimized by the logic circuit which
activates the electromagnets at maximum vibration
occurrences.)

V. CALCULATING BLADE DYNAMIC INDUCTION AND DAMPING

Assuming that a blade is experiencing a 1st order resonance with a vibratory stress of 15,000 psi, the blade has the following typical properties:

(1) $\sigma vib$: = 15000 psi (stress on blade);
(2) $E$: = $17 \cdot 10^6$ psi (Youngs's modulus for titanium - look up);
(3) $Lb$: = 10 inches (blade length):
(4) $c$: = .025 inches (maximum stress location from neutral axis);
(5) $g$: = 386 in/sec 2 (gravity acce3l);

(6) $\delta \tau$: = $\frac{\sigma vib \cdot Lb^2}{3 \cdot E \cdot c}$ inches(tip deflection approximation);
$\delta \tau = 1.176$ inches of tip amplitude.

Now for blade natural frequency:
Given: w:=0.161 lbs/in' for the Ti alloy, and all other parameters are as previously defined, it is seen that the area and moment of inertia for the blade section of a uniform beam is:

(7) $\tau m$ = .118 inches (average air foil thickness);
(8) $Ab$: = $Ch \cdot \tau m \cdot (39.36)^2$ (blade cross sectional area);
(9) $Ab = 0.353$ in^2

(10) $Ib$: = $\frac{Ch}{12} \cdot \tau m^3 \cdot 39.36^4$ (moment of inertia for blade)
$Ib = 4.104 \cdot 10^{-4}$ in^4

(11) $\Omega n$: = $3.52 \sqrt{\frac{E \cdot Ib \cdot g}{w \cdot Ab \cdot Lb^4}}$ -continued
rads/sec (neutral frequency of blade);
$\Omega n = 242.233$ Recalling that:

(12) $\Omega max = 246.091$ rads/sec, it is seen that:
$\frac{\Omega n}{\Omega max} = $ 0.984 or 1st order resonance occurs at 98.4% of maximum rotor speed.

We now know the blade amplitude and frequency of vibration; i.e.: $\delta \tau = 1.176$ inches, $\Omega n = 242.233$ rads/sec (from above); On this basis, the blade tip vibratory velocity is: (13) $V\tau := \delta \tau \cdot \Omega n$   $V\tau = 284.98$ in/sec. (vibratory velocity); Under the calculated flux density, this produces an induced voltage of:

(14) $\delta E$: = $\frac{\beta \cdot Ch \cdot V\tau}{(39.36)^2}$   $\delta E = 0.045$ volts

*$SE - \delta E = .228$ volts leading to an eddy current value of:

(15) $\delta Ie$: = $\frac{\delta E}{Re}$   $\delta Ie = 2173$ amps

*$SE - \delta Ie = 431.5$ amps and a dynamic force of:

16) $\delta Fe$: = $\beta \cdot Ch \cdot \delta Ie$ or:
$\delta Fe = 13.56$ lbs.

The effective damping coefficient is:

(17) $Ce$: = $\frac{\delta Fe}{V\tau}$   $Ce = 0.0107$ lbs sec/in

The modal mass of the beam is approximately (18) $Me$: = $\frac{1w}{3g}$   $Lb \cdot Ab$   $Me = 4.911 \cdot 10^{-4}$ lb sec^2/in To determine the damping effectiveness of the system, the effective damping coefficient calculated for the configuration is compared to the standard of the critical damping (or complete damping of all vibrations).

(19) $\rho e$: = $\frac{Ce}{2 \cdot Me \cdot \Omega n}$   $\rho e = 0.045$

*$SE - \rho e$: = .045 (essentially unchanged);

A preferred embodiment is analyzed in the foregoing calculations to determine the damping potential and the parasitic torque that would effect performance of a turbine engine. The conclusions are positive for this preferred configuration (for which the essential aspects are illustrated in FIG. 5) and for the second embodiment (illustrated in FIG. 6). The parasitic eddy current drag torque is within a tolerable range, i.e., at 2.3% of the maximum engine torque available from a turbine engine wherein the fan blade would be of the size indicated. With regard to damping potential, the estimated value is good. Typically blades without frictional dampers have damping ratios of about 0.001. It is in such cases that high vibratory stress (i.e. 30,000 psi for example) would occur. Assuming that $\rho e$ (above) is achieved, a stress reduction of more than 10/1 would be expected. Even if only a 3/1 reduction is achieved, the vibratory stress will reduce to about 10,000 psi, generally a safe value in terms of fatigue failure for titanium blades.

The calculated effective damping coefficient is large enough with respect to the critical damping coefficient of the system to effectively reduce the level of vibrations in the blades through damping effects. The effective damping coefficient for the second embodiment is also a large enough value for effective damping.

The foregoing merely illustrates the principles of the invention. It will thus be appreciated that those skilled in the art will be able to devise numerous systems and methods which, although not explicitly shown or described herein, embody the principles of the invention and thus fall within the spirit and scope of the invention.

For example, a person skilled in the art may use one electromagnet for each blade. This would increase damping on the blade-disc assembly. However, it is not necessary to have an equal amount of blades and electromagnets since the damping effect of any one electromagnet is shared by all blades as they pass. Therefore the number of electromagnets can range from one to the maximum number that space will allow.

Additionally, the logic for driving the electromagnets could be different than powering all the electromagnets at the same time. For example, under conditions when use of electrical power is severely limited, the logic would be modified to drive one group of magnets at a time, rather than all at once.

Moreover, the placement of the electromagnet assemblies can be to the outside of the casing rather than through a hole in the casing. This would make attachment of the electromagnets easier. However, the effectiveness of the blade damping would decrease as a factor of distance and the makeup of the casing through which the eddy currents must flow.

I claim:

1. An apparatus for damping the vibrations of an array of blades rotating within a casing of a turbomachine, comprising:
   at least one electromagnet coupled to the casing and having poles spaced from the edges of the rotating blades to generate vibration damping eddy currents in the blades; and
   an automatic controller responsive to a condition causing blade vibration for energizing the electromagnet to generate vibration damping eddy currents in the blades.

2. An apparatus for damping the vibrations of an array of blades rotating within a casing of a turbomachine comprising:
   at least one electromagnet coupled to the casing and having poles spaced from the edges of the rotating blades to generate vibration damping eddy currents in the blades;
   wherein at least one of said blades includes a blade tip comprising magnetic material to increase the effect of said damping.

3. A method for damping the vibrations of an array of blades rotating within a casing of a turbomachine which has at least one electromagnet coupled to the casing with poles spaced from the edges of the rotating blades comprising:
   monitoring a condition causing blade vibration; and
   automatically energizing the electromagnet in response to such condition to generate vibration damping eddy currents in the blade.

4. A method for damping the vibrations of an array of blades rotating within a casing of a turbomachine which has at least one electromagnet coupled to the casing with poles spaced from the edges of the rotating blades comprising:
   monitoring a condition causing blade vibration; and
   energizing the electromagnet in response to such condition to generate vibration damping eddy currents in the blade;
   wherein the condition monitored is a resonance speed of rotation of the blades.

5. A method for damping tip vibrations of blading used in a turbomachine comprising the steps of:
   comparing operation parameters of said turbomachine to a preselected range of values;
   generating power to at least one electromagnet placed in the casing surrounding a blade-disk assembly in said turbomachine when said operation parameter is within said preselected range; and
   damping said tip vibrations by utilizing eddy currents generated in said blades from at least one electromagnet.

6. An apparatus for damping the vibrations of an array of blades rotating within a casing of a turbomachine, comprising:
   at least one electromagnet coupled to the casing and having poles spaced from the edges of the rotating blades to generate vibration damping eddy currents in the blades; and
   a controller responsive to a condition causing blade vibration for energizing the electromagnet to generate vibration damping eddy currents in the blades; and
   the controller includes means responsive to a speed of the rotating blades.

7. An apparatus for damping the vibrations of an array of blades rotating within a casing of a turbomachine, comprising:
   at least one electromagnet coupled to the casing and having poles spaced from the edges of the rotating blades to generate vibration damping eddy currents in the blades; and
   a controller responsive to a condition causing blade vibration for energizing the electromagnet to generate vibration damping eddy currents in the blades; and
   the controller includes means responsive to a speed of the rotating blades where said speed is a function of a resonance speed of said rotating blades.

8. An apparatus as set forth in claim 1 in which the controller includes means responsive to a speed of the rotating blades, an inlet pressure of said turbo machine and a temperature of said turbo machine.

9. An apparatus as set forth in claim 1 wherein said apparatus includes a plurality of said electromagnets separated circumferentially about the casing.

10. An apparatus as set forth in claim 9 wherein said plurality of electromagnets are placed within the casing.

11. The apparatus as set forth in claim 10 wherein said plurality of electromagnets are placed in three groups of three electromagnets separated by about 120° circumferentially in the casing.

12. An apparatus as set forth in claim 1 wherein said at least one electromagnet is placed within the casing.

13. An apparatus as set forth in claim 1 wherein the rotating blades are comprised of non-magnetic material.

14. An apparatus as set forth in claim 1 wherein at least one of said blades includes a blade tip comprising magnetic material to increase the effect of said damping.

15. The method of claim 5 including removing power from at least one electromagnet when said operation parameter is not within said range.

16. The method of claim 5 wherein said operation parameter comprises blade speed and said preselected value range is a function of said blade-disk resonance speed.

* * * * *

UNITED STATES PATENT AND TRADEMARK OFFICE
CERTIFICATE OF CORRECTION

PATENT NO. : 5,490,759

DATED : February 13, 1996

INVENTOR(S) : Hoffman

It is certified that error appears in the above-indentified patent and that said Letters Patent is hereby corrected as shown below:

Column 1, line 50, "use(]" should read -- used --;

Column 7, line 44, " $\frac{\text{Blisk Definition}}{\text{configuration}}$ - parameters for the blades on the disk" should read -- Blisk Definition - parameters for the blades configuration on the disk --;

Column 8, line 65, "Δmax" should read -- Ωmax --;

Column 9, line 3, "τmax" should read -- Ωmax --;

Column 9, line 11, " $\frac{\beta\alpha}{5}$ " should read -- $\frac{\beta g}{5}$ --;

Column 9, line 22, "*SE = Re" should read -- *SE - Re --;

Column 9, line 30, "grag" should read -- drag --;

Column 9, line 49, "386 in/sec 2 (gravity acce31)" should read -- 386 in/sec^2 (gravity accel) --; and Column 9, line 54, "lbs/in'for" should read -- lbs/in^3 for --.

Signed and Sealed this

Second Day of July, 1996

Attest:

Attesting Officer

BRUCE LEHMAN

Commissioner of Patents and Trademarks